United States Patent [19]

Gallo et al.

[11] Patent Number: 5,673,337

[45] Date of Patent: Sep. 30, 1997

[54] CHARACTER RECOGNITION

[75] Inventors: Girolamo Gallo, Santa Rufina; Cristina Lattaro, Rieti; Giuseppe Savarese, Napoli, all of Italy

[73] Assignee: Texas Instruments Incorporated, Dallas, Tex.

[21] Appl. No.: 454,450

[22] Filed: May 30, 1995

[30] Foreign Application Priority Data

May 30, 1994 [IT] Italy ................................ RM94A0338

[51] Int. Cl.$^6$ .................................................. G06K 9/00
[52] U.S. Cl. ........................................... 382/187; 382/204
[58] Field of Search ................................. 382/187, 188, 382/185, 186, 190, 192, 197, 198, 204, 217, 220

[56] References Cited

U.S. PATENT DOCUMENTS

| | | | |
|---|---|---|---|
| 4,850,026 | 7/1989 | Jeng et al. | 382/185 |
| 5,454,046 | 9/1995 | Carman, II | 382/186 |
| 5,515,455 | 5/1996 | Govindaraju et al. | 382/186 |

*Primary Examiner*—Leo Boudreau
*Assistant Examiner*—Phuoc Tran
*Attorney, Agent, or Firm*—Richard L. Donaldson; William B. Kempler

[57] ABSTRACT

This invention relates to a method and apparatus for recognizing a script written character. The character is entered using character entering device and digitised by appropriate device. The digitised character is then stored in, for example, a memory. Codes representing topological, vector dimension features and the microfeatures of the character are extracted from the character, then the features of the character are compared with a set of reference features corresponding thereto stored in a memory. Each of the set of reference characters corresponding with a specific script written character. A logic process is then performed to determine which of the set of reference features most closely corresponds to the topological features of the digitized character thereby identifying the script written character. The relative weighting of the feature can be varied for different types of script or confusing characters to enable still more accurate recognition.

21 Claims, 9 Drawing Sheets

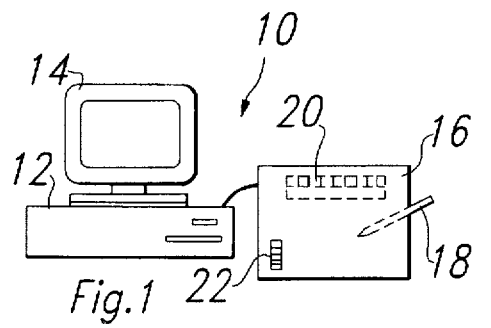
Fig.1
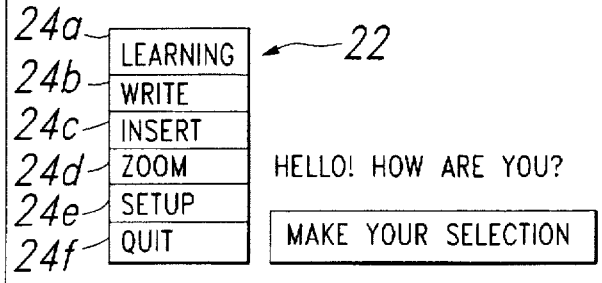
Fig.2
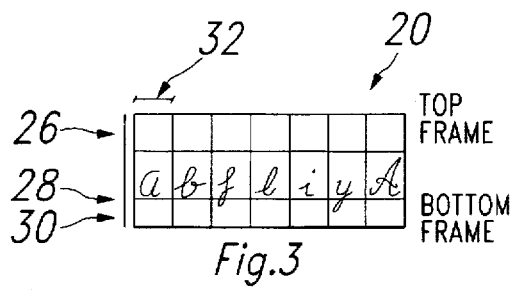
Fig.3
```
CHAR A
  STROKES 2
  FRAME 1  POINTS 39
   218 69    218 68
   218 67    218 66
   218 65    218 64
   218 62    219 61
   219 59    219 57
   220 55    221 53
   221 52    222 50
   223 49    224 48
   225 47    226 46
   227 45    228 45
   229 45    230 44
   231 44    232 44
   233 45    233 46
   234 47    234 48
   235 49    235 51
   235 53    236 56
   236 58    236 60
   236 62    236 64
   236 66    236 68
   236 69
  STROKE 2 POINTS 13
   219 59    218 58
   219 57    220 57
   221 57    223 57
   225 56    227 56
   229 56    231 56
   233 56    234 55
   234 56
```
Fig.4
```
CHAR A  STROKES 2
. . . . . . . . # # # # # . . .
. . . . . . # # . . . . . # . .
. . . . . # . . . . . . . . # .
. . . . . # . . . . . . . . # .
. . . . # . . . . . . . . . . #
. . . . # . . . . . . . . . . #
. . . # . . . . . . . . . . . #
. . . # . . . . . . . . . . . #
. . # . . . . . . . . . . . . #
. # . . . # # # # # # # # # # #
. # # # . . . . . . . . . . . #
#  . . . . . . . . . . . . . . #
#  . . . . . . . . . . . . . . #
#  . . . . . . . . . . . . . . #
#  . . . . . . . . . . . . . . #
#  . . . . . . . . . . . . . . #
#  . . . . . . . . . . . . . . #
#  . . . . . . . . . . . . . . #
#  . . . . . . . . . . . . . . #
#  . . . . . . . . . . . . . . #
```
'#' IS LOGIC 1 (BLACK PIXEL)
'.' IS LOGIC 0 (WHITE PIXEL)
Fig.5

| ORIGINAL PATTERN | FEATURE PATTERNS | LOGIC 1's IN COMMON | |
|---|---|---|---|
| | ################ | | |
| | ................ | | |
| | ................ | | |
| | ................ | | |
| | ................ | | |
| | ................ | | |
| | ................ | | |
| | ................ | | |
| | ................ | 6 | |
| | ................ | | |
| | ................ | | |
| | ................ | | |
| | ................ | | |
| | ................ | | |
| | ................ | | |
| | ................ | | |
| | ................ | | |
| | ................ | | |
| ........#####... | ..............#.... | | |
| ......##.....#.. | ..............#.... | | |
| .....#......#.. | ..............#.... | | |
| ....#.......#.. | ..............#.... | | |
| ....#........#. | ..............#.... | THRESHOLD VALUES | FEATURE EXTRACTION CODE |
| ...#.........# | ..............#.... | | |
| ...#.........# | ..............#.... | | |
| ..#..##########| ..............#.... | 2    2, 3, 6, | 312.... |
| .####........# | ..............#.... | | |
| #............# | ..............#.... | | |
| #............# | ..............#.... | | |
| #............# | ..............#.... | | |
| #............# | ..............#.... | | |
| #............# | ..............#.... | | |
| #............# | ..............#.... | | |
| | ................ | | |
| | ................ | | |
| | ................ | | |
| | ................ | | |
| | ................ | | |
| | ................ | | |
| | ................ | | |
| | ................ | | |
| | ................ | 5 | |
| | .............##. | | |
| | ............##.. | | |
| | ...........##... | | |
| | ..........##.... | | |
| | .........##..... | | |
| | ........##...... | | |
| | .......##....... | | |
| | ......##........ | NOTE: | |
| | .....##......... | '#' IS LOGIC 1 (BLACK PIXEL) | |
| | ....##.......... | '.' IS LOGIC 0 (WHITE PIXEL) | |

Fig.7

CHARACTER RECOGNITION

BACKGROUND OF THE INVENTION

This invention relates to a method and apparatus for character recognition, particularly the recognition of letters, numerals and other symbols such as Japanese characters, musical symbols, simple drawings and the like.

In keyboardless input schemes for computer systems, for example, instructions or data can be input by the user of the system by means of a pen-like stylus on an input/output screen. An example of such a screen is a touch sensitive monitor. The input instructions or data can be handwritten script, numbers, or any other form of handwritten character. In these types of systems it is essential for the computer to "understand" the input it has been given by the user and to recognize and read the input characters.

There are a number of known systems capable of recognizing and reading input characters. One such system is disclosed in U.S. Pat. No. 4,972,496. This patent discloses a system including a transparent input screen that generates positional information corresponding to the positions at which a stylus contacts the screen (i.e. the positional information of the character) and also displays to the user the input that has been entered. The system further includes a computer which is programmed to compile the positional information into "Strokes" made by the stylus. The strokes are analyzed to identify the starting point of each stroke, the end of each stroke, the slope of the stroke, the stroke contriod, the rate of change of the slope, and where a character comprises more than one stroke whether it was the first, second, etc. Once the stroke alone has been analyzed a personalized data base which is unique to a specific user is accessed to identify the character which most closely corresponds to the character under analysis.

This system is relatively complex to implement using dedicated hardware for stroke analysis due to the detailed stroke analysis which must be conducted. In addition it relies on a personalized data base for each user. This can mean that a large amount of memory is wasted if a given system is used by many users. If no personalized data base is set up the degree of recognition of the system can fall to an unacceptable level. Since this system relies only on stroke analysis it is important for all users to write the characters in a predetermined conventional manner. Recognition is severely inhibited when the user adopts a writing style where the strokes are different from the predetermined conventional manner. Even though the free style characters may look very similar to the conventional characters, recognition may not be accurate since the stroke analysis indicates a different character than that which has been written.

Some of the problems of the prior art have been overcome by the inventions described in our applications, EP 92830656.2 (TI-17878) and EP 94830118.9 (TI-17878). In the latter case, a system was disclosed which analyses the topological and vector features of each handwritten character. These features are then compared with a set reference topological and vector features to identify the character.

However, even with this system, it was sometimes difficult to identify the difference between upper case and lower case letters such as "C" and "c". To some extent, this could be resolved by requiring the user to enter letters into a frame in a certain manner.

For example, in EP 94830118.9 the input box comprised three frames. Short lowercase letters such as a, c, e, m, n, o, r, s, u, v, w, x and z had to be entered in the middle frame, while taller lowercase letters such as b, d, f, h, i, k, l and t as well as uppercase letters and numbers had to be entered in the top and middle frame.

This was successful only if the user entered the characters correctly. If the user didn't enter the characters in the required manner the system could mis-recognise the user inputs.

One object of the present invention is to overcome at least some of the problems of the prior art.

According to one aspect of the present invention, there is provided a method for recognising a script written character comprising the steps of entering the character using character entering means; digitizing the character; storing the digitized character; extracting topological features and vector features of said character; extracting microfeatures of the character; determining dimensions of the character; comparing the topological and vector features of the character with a set of reference features equivalent thereto and stored in a memory, each of the set corresponding to a specific character; and performing a logic process to determine which of the set of reference features most closely corresponds to the topological features, the vector features, the microfeatures and the dimensions of the digitized character, thereby recognizing the script written character.

According to another aspect of the invention the logic means evaluates a score Sj for each reference character (Nd) and identifies the reference character with the lowest score as that corresponding to the script written characters, wherein Sj is given by:

$$Soj = SW*|S - Stj| + \sum_{i=1}^{99} |fi - fij| + IW* \sum_{i=1}^{32} |Ni - Nij|$$

where:

S=Stroke number of the input character

Stj=stroke number of the j-th reference character fi=response of the i-th feature to the input character fij=response of the i-th feature to the j-th reference character Ni=number of intersections of the i-th line with the input character Nij=number of intersections of the i-th line with the j-th reference character SW=stroke weight IW=intersection weight Recognition of characters is improved using this method and is easier for the user to operate. In addition, the confusion between upper and lower case letters having the same shape is dramatically improved.

BRIEF DESCRIPTION OF THE DRAWINGS

Reference will now be made, by way of example to the accompanying drawings, in which:

FIG. 1 is a block diagram of a character recognition system according to one aspect of the present invention;

FIG. 2 is a diagram of an example of a program memory displayed on the screen of the system;

FIG. 3 is a diagram showing some examples of characters with frame constraint defaults;

FIG. 4 is a diagram of the stroke format of character A;

FIG. 5 shows the conversion of the STK format in FIG. 4 to the PTN format;

FIG. 6, composed of FIGS. 6a–6g on separate sheets, is a diagram showing a set of topological features used to identify any character; and FIGS. 7 and 8 are diagrams showing how the character is recognized.

DETAILED DESCRIPTION

Figures 6G, 8:
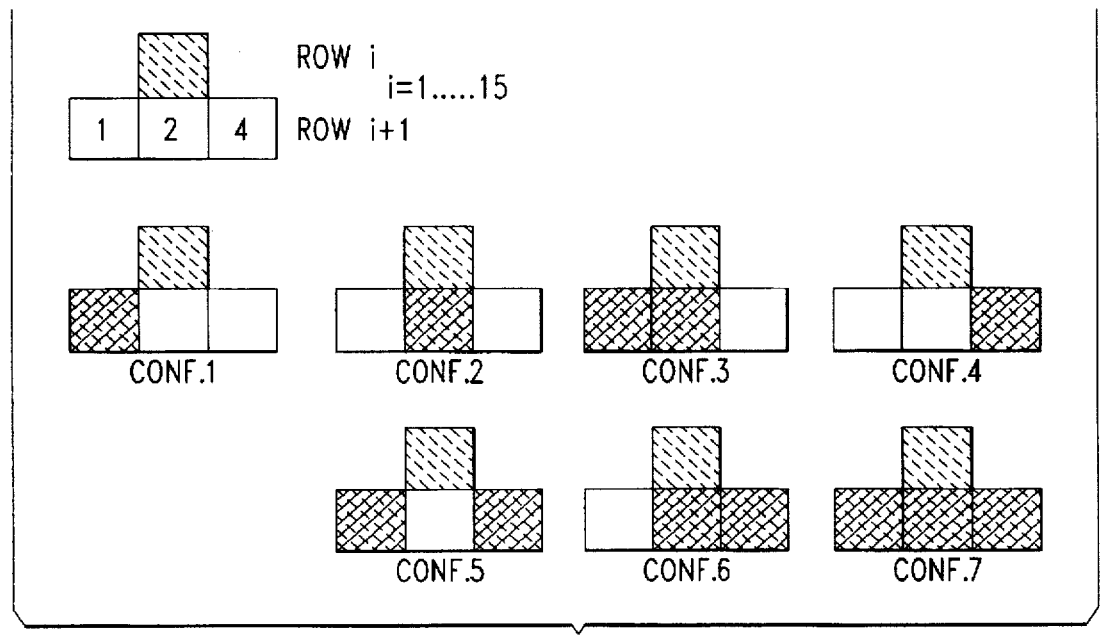

Referring to FIG. 1 a character recognition system is shown generally at 10. The system comprises a microcomputer 12 having a monitor 14. The computer is connected to a touch sensitive screen, for example an LCD graphic digitizer 16. It is possible to replace the monitor with a touch sensitive monitor and dispense with the separate touch sensitive screen. A pen-like stylus 18 may be used on the touch sensitive screen to input instructions, data or the like to the computer. A user can write commands directly onto the screen. For the most accurate recognition of the commands the characters should preferably be entered in a frame shown generally at 26. The touch sensitive screen menu used by the user to enter information is shown in FIG. 2. The main options available are shown in blocks 22 and may be activated by touching the stylus on the appropriate box 24a–f.

The character input box is shown in more detail in FIG. 3. It is divided in two frames (top frame 26 and bottom frame 30) by a writing line 28. Each character should be ideally entered into one column 32. The position of the character is used to aid in the recognition of that character. Lower case letters with a "tail", such as g, j, p, q and y should preferably be entered such that the tails extend into the bottom frame. All the other lowercase and upper case letters as well as numerals should generally be entered in the top frame of any given column 32. Other characters such as punctuation, for example, should be entered in their normal positions relative to the alphanumeric characters.

Adhering to the position constraint illustrated above allows the system to recognize the a difference between "q" and "9" for example.

The present system version overcomes the limitation of the prior art and in fact all the following characters can be entered in any position within the top frame 26: a, b, c, d, e, f, n, m, i, k, l, m, n, o, r, s, t, u, v, w and z. Recognition of uppercase and lowercase letters with the same shape (e.g. 'c' and 'C') is improved by a particular feed-back routine, as will be described in more detail below.

It is possible for the operator to set the position of the writing line or to use its default value. For those alphabets such as Japanese characters which do not have symbols of the same shape but different position, position constraints are not necessary and the user can enter the characters in the input box with no frame constraint. The same holds if the system is used for geometrical symbols or drawing recognition. The full detail of how the position constraint aids recognition will be described in more detail below.

The writing position is coded by assigning a score to each of the two writing frames: 2 for the top frame 26 and 4 for the bottom one 30. For instance, character 'g' is normally written in the top and bottom frames, so its position number will be 2+4=6. Position numbers are evaluated by checking the character position on the writing field. In order to disregard small framing errors by the user, the active area under the writing line is actually slightly smaller than indicated. This means that the actual boundary between the top and bottom input box parts is slightly lower than shown. The amount of this shift may be adjusted by the user.

Once the handwritten data has been entered on the LCD graphic digitizer 16 the output of the digitizer is downloaded to the computer into what is called a stroke format file (STK file). In such a format the character is described by a sequence of strokes each of which is made up of a series of coordinates between a pen-down and pen-up condition. FIG. 4 shows an ASCII format translation of the content of a stroke file in binary form of the letter A. The output from the digitizer is then "pre-processed" before character recognition is implemented. This pre-processing comprises character scaling, centering, digital noise filtering and fitting the digital information into a pixel matrix of a given size, for example, a 16×16 matrix.

After pre-processing the character undergoes a recognition process which comprises the following basic steps:

extraction of the topological characteristics (features) of the input handwritten character;

extraction of microfeatures of the character;

character vector code determination;

character size determination; and recognition by 'fuzzy' comparison with a set of reference characters stored in a memory and occasionally feedback recognition.

The handwriting recognition is performed on each individual character once it has been written. This allows for total freedom in writing the characters according to the user's style, i.e. it is not necessary to enter the character as a particular sequence of strokes. This can allow for variations in the direction of movement of the pen and corrections can be effected after the characters have been originally written. The recognition is mainly based on symbol's optical characteristics. To solve ambiguities due to the optical aspect of the characters such as "S" and "5" a vector code is determined for each character. This vector code determination will be described in more detail below. As previously stated, the recognition of uppercase and lowercase letters with the same shape (e.g. 'c' and 'C') is improved by the user writing in fields or frames and feedback recognition.

This particular system is optimized for characters as well as all other signs usually found in a standard computer keyboard. However, the system has been optimised for all alphabets, Japanese characters, geometrical symbols and simple drawings. In addition the principle is valid for all other alphabets. The system can be used in a writer dependent mode, in which it shows better recognition rate. However, very good recognition is possible when used as a writer-independent system, i.e. without the system training. The user can enter his own reference character set through a user friendly training mode. Once adequately trained, the system can accept any handwriting style. For example, one user may train the system to recognize multiple character styles for a given alphabet letter, or his special way of writing a given character. Alternatively, the system can be used in "untrained mode" with a standard set of characters.

The pre-processing initially converts the STK format described above to a pattern (PTN) format of a normalized 16×16 matrix. This PTN format is shown in FIG. 5.

Character pre-processing has been optimized in terms of speed and of memory needed. The use of a new thinning and interpolation routine makes the feature extraction process faster and more efficient. This approach has allowed a reduction of the number of feature matrices form 99 to 79, see FIG. 6.

The conversion from the stroke to the pattern format occurs as follows: All the point coordinates in the STK format are multiplied by 16. The new co-ordinates ($t\_x$, $t\_y$) of the original point (x,y) are given by:

$$t\_x = 16 * x$$

$$t\_y = 16 * y$$

while the character box width x_fact and its height y_fact are:

$$x\_fact = t.max.x - t.min.x$$

$$y\_fact = t.max.y - t.min.y$$

t.max.x, t.min.x, t.max.y and t.min.y being the edges of the character box.

If the ratio of either x-fact/y-fact or y-fact/x-fact is larger than a given threshold value (typically 4) only the larger component of the character is scaled. This is to avoid improper expansion of "slim" characters such as "I" or "-". This check is performed through the following steps:

```
if(y_fact >=x_fact) {
    if(x_fact *4 <y_fact)
    x-fact = y-fact;
    offs.x = t.min.x + 1;
    offs.y = (t.min.y + t.max.y-y_fact)/2;}
``` where offs.x and offs.y are the coordinates of the origin of the scaled character box. An analogous procedure is applied if x_fact>=y_fact.

The position of a given point (t_x, t_y) in the 16*16 character matrix can be determined by the formula:

$$R = 16-(t\_x-offs\_x)*16/x\_fact$$

$$C = (t\_y-offs\_y)/y\_fact$$

R and C being the row and column which the point belongs to.

In the 16*16 character matrix two consecutive points may belong to non-adjacent pixels. This would result in an 'hole' in the character stroke. To overcome this drawback an interpolation routine is performed to fill the empty pixels.

For each pair of consecutive pixels (R, C) and (R1, C1) the parameter NUM, that is the maximum difference between their coordinates, is calculated:

$$NUM = max\ (abs(R-C), abs(R1-C1))$$

If NUM is greater than 1, NUM points are inserted between the two pixels by linear interpolation. Then all the matrix pixels which contain at least one point are set to 1 (black) and those which do not contain any point are set to 0 (white). Once interpolation is completed, a character thinning routine is applied to make the character strokes as thin as possible. This is done considering three consecutive pixels of the 16*16 matrix Pi=(Ri, Ci), Pi+1=(Ri+1, Ci+1), Pi+2=(Ri+2, Ci+2) and evaluating.

$$MAXDIFF = max\ (abs(Ri+2-Ri), abs(Ci+2-Ci))$$

If MAXDIFF=1, the two points Pi and Pi+2 are consecutive, therefore Pi+1 is set to 0. On the other hand if MAXDIFF>1 Pi and Pi+2 are not consecutive and Pi+1 is left black. Then the routine is repeated considering the next tern of points, if MAXDIFF=1 this will be made up of Pi+2, Pi+3 and Pi+4. Alternatively, if MAXDIFF>1 Pi+1, Pi+2 and Pi+3 will be considered. Once the described thinning procedure has been completed, the PTN character format is available. This format for the letter A is shown in FIG. 5.

At the top of the matrix is a header data line containing the following information:

a) Character identifier (available only if the character is a member of the reference set);

b) Number of strokes; and c) Frame positioning.

The header data line may also contain character vector codes and dimension information feedback recognition.

The first step of the recognition process consists in extracting from the original 16×16 matrix and from the STK character format a character code. Recognition is then performed by comparing an input character code with the codes of reference characters collected by the user during the learning phase or from the standard set in the memory.

The character code basically contains five types of information:

i) Feature extraction code;

ii) Microfeature detection code;

iii) Frame position, stroke number, character identifier (the latter only being available if the character is a member of the reference set);

iv) Character vector code v) Character size (its width X and its height Y).

Feature extraction is the key step of the recognition algorithm. It performs a faithful description of character's topology to make recognition very accurate. This operation is performed by using a 'topological feature set'. It consists of the seventynine 16×16 matrices shown in FIG. 6 representing elementary geometrical structures. These matrices have been obtained through a complex work of optimization performed using several character sets from many different people.

The feature extraction process basically consists of overlapping the character to the i-th (i=1, ..., 79) feature matrix and then counting the number of black pixels they have in common. This operation can be easily implemented by means of a bitwise AND function. The counting result X is then compared with three threshold values, T1, T2, T3;

| | |
|---|---|
| if X<=T1 | the response fi of the i-th feature is set to 0 |
| if T1<X<=T2 | the response fi of the i-th feature is set to 1 |
| if T2<X<=T3 | the response fi of the i-th feature is set to 2 |
| if X>=T3 | the response fi of the i-th feature is set to 3 |

This process is shown in FIG. 7. Therefore, the result of the described operation is an array of seventy nine integer values called feature extraction code representing the response of the feature set to the given character. T1, T2, T3 are chosen from simulations of the system and are typically set to be T1=2, T2=3, T3=6.

Thanks to the new preprocessing routine, the number of feature matrices has been reduced from ninety nine to seventy nine, without affecting the recognition accuracy.

The microfeature detection code contains optical information related to some particular pixel configurations which may occur in the 16×16 character matrix. These are detected by scanning the top 15 rows of the character matrix column by column from left to right. Any time a black pixel is found the configuration of the neighbour pixels belonging to the lower row is memorized, while no action is taken when a white pixel is encountered. To be specific, if the coordinates of a black pixel in the i-th matrix row are P=(i,j), the algorithm checks for the presence of black pixels in the following positions: A=(i+1, j), B=(i+1,j-), C=(i+1,j+1). Each configuration is coded by assigning a score to each of the three positions, 1 for A, 2 for B and 4 for C. For instance, if the pixel P is black and there are black pixels in A and C and a white pixel in B, the microfeature code will be 1+4=5. FIG. 8 shows all the possible configurations and the related code values.

This operation is performed considering only the first five black pixels of each row. If a row contain more than five black pixels, they are disregarded, while if there are less than five black pixels the remaining feature code fields are set to 0. Therefore, the microfeature detection code consists of 15 (rows) *5(black pixels) 3-bit values.(29 bytes). The microfeature cede is indicated by Ri(k) (i=1, ... ,15; k=1, ... 5) related to the k-th black pixel of the i-th matrix row. An additional information that is required is the number P of non-zero Ri(k) values. Thus the microfeature character code storage requires 30 bytes.

The next field of the character code contains the frame position, the number of strokes of the character and, if the character is a member of the learning sets, its identifier, provided by the user.

Character vector code has been normalized, in order to optimize the amount of memory required to store dynamic information and to eliminate the need to shift the vector codes of the symbols to be compared during the recognition process. This approach provides at the same time: a dramatic improvement in recognition speed (3 times faster than in the previous version), a reduction of the memory needed to store the character DIN/APP code (27 bytes/char) and a considerable reduction of the program size. Since the new version of the DIN code provides a more faithful description of the writing dynamics, certain codes such as the REL code are no longer necessary and have been eliminated. The optimized character vector code includes the following vector information:

i) DIN, an array of 27 3-bit values describing, in a normalized format, the relative position of the points in the STK character format.

ii) APPX, which is an array of 27 2-bit values describing, in a normalized format, the position of the X-coordinate of the points of the character STK format with respect to the X-coordinate of the first and last points of STK character format.

iii) APPY, which is an array of 27 2-bit values describing the position of the Y-coordinate of the points of the character STK format with respect to the Y-coordinate of the first and last points of STK character format.

DIN parameters are evaluated in the following manner.

The co-ordinates of a given point Pi in the STK format are given by (Xi,Yi) and the co-ordinates of the subsequent one Pi+1 are given by (X(i+1), Y(i+1)). The features previous systems for the determination of pen-up and pen-down in the STK point sequence are disregarded, therefore the following method can be applied even if the two points belong to different strokes. Let DXi (DYi) the difference between the x (y) co-ordinates of Pi and Pi+1. The length L of the polygonal connecting the $Ns_{stk}$ points is evaluated through the formula:

$$L = \sum_{i=1}^{(N_{stk}-1)} \max(DXi, DYi)$$

Since the number of DIN parameters to be considered has been fixed (by extensive simulations) to 27, the weight of the Pi and Pi+1 points is given by $$[Ni]=[27*\max\{DXi,DYi\}+R(i-1)]/L$$

i=1, ... ,$N_{stk}$−1 where Ni is the integer part of Ni and R(i−1) is the remainder of the previous iteration. If Ni=0, no information related to the pair of points i, i+1 is inserted into the DIN code. On the contrary, if Ni≠0, the DIN code is evaluated through the following flow:

```
if (Xi > X(i+1)){
    if (Yi > Y(i+1)) DIN=3;
    if (Yi == Y(i+1)) DIN=2;
    if (Yi < Y(i+1)) DIN=4;
}
else if (Xi == X(i+1)){
    if (Yi >= Y(i+1)) DIN=0;
    if (Yi < Y(i+1)) DIN=1;
}
else if (Xi < X(i+1)){
    if (Yi > Y(i+1)) DIN=6;
    if (Yi == Y(i+1)) DIN=5;
    if (Yi < Y(i+1)) DIN=7;
}
```

The DIN parameters of the pair Pi, Pi+1 is entered Ni times in the character DIN code. Since the DIN values range between 0 and 7, a 3 bit value is needed to represent each of them. For instance, if a character is made up of the following 5 points:

P1: (3,6)
P2: (3,8)
P3: (4,7)
P4: (3,7)
P5: (3,8)

we obtain: L=2+1+1+1=5 and

| N1 = 10 | R1=4 |
| N2 = 6  | R2=1 |
| N3 = 5  | R3=3 |
| N4 = 6  | R4=0 |

Note that N1+N2+N3+N4=27. Therefore the character DIN code is given by:

| DIN[0]= 1;  | DIN[1]= 1;  | DIN[2]= 1;  |
| DIN[3]= 1;  | DIN[4]= 1;  | DIN[5]= 1;  |
| DIN[6]= 1;  | DIN[7]= 1;  | DIN[8]= 1;  |
| DIN[9]= 1;  | DIN[10]= 6; | DIN[11]= 6; |
| DIN[12]= 6; | DIN[13]= 6; | DIN[14]= 6; |
| DIN[15]= 6; | DIN[16]= 2; | DIN[17]= 2; |
| DIN[18]= 2; | DIN[19]= 2; | DIN[20]= 2; |
| DIN[21]= 1; | DIN[22]= 1; | DIN[23]= 1; |
| DIN[24]= 1; | DIN[25]= 1; | DIN[26]= 1; |

The parameters APPX and APPY represent the position of the points in the STK character format with respect to the first and last points. As previously indicated, pen-up and pen-down co-ordinates are not considered.

Assuming:

(Xi,Yi) are the co-ordinates of the current point in the STK character format (Xo,Yo) are the co-ordinates of the first point (Xn,Yn) are the co-ordinates of the last point As for the DIN parameters, APPX and APPY values related to the Pi point are evaluated only if N(i−1)≠0 and repeated Ni times. They are obtained as follows:

|        | if (Xn>Xi)  | && | Xo>Xi )  | APPX=0; |
|        | if (Xn>Xi)  | && | Xo<=Xi)  | APPX=1; |
|        | if (Xn<=Xi) | && | Xo>Xi )  | APPX=2; |
|        | if (Xn<=Xi) | && | Xo<=Xi)  | APPX=3; |
| whilst |             |    |          |         |
|        | if (Yn>Yi)  | && | Yo>Yi )  | APPY=0; |
|        | if (Yn>Yi)  | && | Yo<=Yi)  | APPY=1; |

| | | |
|---|---|---|
| if (Yn<=Yi | && | Yo>Yi ) APPY=2; |
| if (Yn<=Yi | && | Yo<=Yi) APPY=3; |

The number of APPX and APPY values for each character is 27, as for DIN parameters. Since the possible values range between 0 and 3 and a 2-bit value is needed to represent each of them, 2*2*27=108 bits are required. For instance, the APP code for the character in the previous example is:

| | | |
|---|---|---|
| APPX[0] = 3; | APPX[1] = 3; | APPX[2] = 3; |
| APPX[3] = 3; | APPX[4] = 3; | APPX[5] = 3; |
| APPX[6] = 3; | APPX[7] = 3; | APPX[8] = 3; |
| APPX[9] = 3; | APPX[10] = 3; | APPX[11] = 3; |
| APPX[12] = 3; | APPX[13;] = 3; | APPX[14] = 3; |
| APPX[15] = 3; | APPX[16] = 3; | APPX[17] = 3; |
| APPX[18] = 3; | APPX[19] = 3; | APPX[20] = 3; |
| APPX[21] = 3; | APPX[22] = 3; | APPX[23] = 3; |
| APPX[24] = 3; | APPX[25] = 3; | APPX[26] = 3; |
| and | | |
| APPY[0] = 3; | APPY[1] = 3; | APPY[2] = 3; |
| APPY[3] = 3; | APPY[4] = 3; | APPY[5] = 3; |
| APPY[6] = 3; | APPY[7] = 3; | APPY[8] = 3; |
| APPY[9] = 3; | APPY[10] = 1; | APPY[11] = 1; |
| APPY[12] = 1; | APPY[13] = 1; | APPY[14] = 1; |
| APPY[15] = 1; | APPY[16] = 1; | APPY[17] = 1; |
| APPY[18] = 1; | APPY[19] = 1; | APPY[20] = 1; |
| APPY[21] = 1; | APPY[22] = 1; | APPY[23] = 3; |
| APPY[24] = 3; | APPY[25] = 3; | APPY[26] = 3; | where $(Xo,Yo)=(3,6)$ and $(Xn,Yn)=(3,8)$

The last field of the character code contains character size information its width X (1 byte) and its height Y (1 byte).

Therefore, after the coding process a given character is represented by an array of 83 bytes: 20 from feature extraction, 30 from microfeature detection, 1 for stroke number, 1 for frame position, 1 for character identifier (if available), 27 for DIN, APPX and APPY, 2 for width and height. One more byte is required to keep track of the number of misrecognitions due to a given reference character, as it will be explained later.

Recognition is performed by comparing the code of the unknown input character with the coded characters in the reference set having the same position number. Characters with position numbers different from that of the input character are disregarded during the comparison. This has two important advantages. First, it allows recognition of characters with the same shape and different position (such as 'q' and '9'). Secondly, the recognition process is relatively faster because it involves a lower number of comparisons. As a result, the score Sj is given by:

$$Sj = Wf*Sfj - Wm*Smj - Wd*Sdj + Ws*|St-Stj| + Wx*|X-Xj| + Wy*|Y-Yj|$$

and is assigned to the comparison between the unknown input character and the j-th character in the character database. In the equation Sfj, Smj and Sdj are respectively: the feature extraction score, the microfeature detection score and the dynamic score, while Wf, Wm and Wd are weighting factors which describe their relative importance.

In addition, in the equation:

St = stroke number of the input character
Stj = stroke number of the j-th reference character
Ws = stroke weight
X = width of the input character
Xj = width of the j-th reference character
Wx = width weight
Y = height of the input character
Yj = height of the j-th reference character
Wy = height weight This score is evaluated for each of the Ncar reference characters.

The feature score Sfj assigned to the j-th comparison (j=1, ..., Ncar) is given by:

$$Sfj = \text{SUM}_{i=1}^{79} |fi - fij|$$

where:

fi = response of the i-th feature to the input character
fij = response of the i-th feature to the j-th reference character The microfeature code evaluation Smj is given by the formula:

$$Smj = \left\{ \text{SUM}_{k=1}^{5} \text{SUM}_{i=1}^{15} M[Rik][Rjik] \right\} / \max(P, Pj)$$

where:

Rik (k=1, ... 5, i=1 ... 15) is the microfeature code of the input character,

Rjik (k=1, ... 5, i=1 ... 15) is the microfeature code of the j-th reference character, P is the number of non-zero Rik elements, Pj is the number of non-zero Rjik elements, and M is the following matrix:

{0,0,0,0,0,0,0,0}
{0,3,0,2,1,2,0,1}
{0,0,3,2,1,0,2,1}
{0,2,2,3,0,1,1,2}
{0,1,1,0,3,2,2,0}
{0,2,0,1,2,3,1,1}
{0,0,2,1,2,1,3,1}
{0,1,1,2,0,1,1,3}

The dynamic character score Sdj is evaluated by a comparison of the DIN and APPX/APPY codes. Let DIN, APPX, APPY the parameters refer to the input character and DINj, APPXj, APPYj refer to the j-th character in the reference set. The comparison is performed as follows. APPX[i], that is i-th element of the APPX array is compared with APPXj[i] and APPY[i]is compared with APPXj[i](i=1,... ,27). Then, four different cases may occur:

a) APPX[i]=APPXj[i] APPY[i]=APPYj[i]

In this case the comparison result Cij is given by the element located in the (DIN[i], DINj[i]) position of the matrix:

{2,0,0,1,0,0,1,0}
{0,2,0,0,1,0,0,1}
{0,0,2,1,1,0,0,0}
{1,0,1,2,0,0,0,0}
{0,1,1,0,2,0,0,0}
{0,0,0,0,0,2,1,1}
{1,0,0,0,0,1,2,0}
{0,1,0,0,1,1,0,2} b) APPX[i]=/APPXj[i]APPY[i]=APPYj[i]

In this case the comparison result Cij is given by the element located in the (DIN[i], DINj[i]) position of the matrix:

{1,0,0,1,0,0,1,0}
{0,1,0,0,1,0,0,1}

{0,0,1,0,0,0,0,0}
{1,0,0,1,0,0,0,0}
{0,1,0,0,1,0,0,0}
{0,0,0,0,0,1,0,0}
{1,0,0,0,0,0,1,0}
{0,1,0,0,0,0,0,1} c) APPX[i]=APPXj[i]APPY[i]=/APPYj[i]

In this case the comparison result Cij is given by the element located in the (DIN[i], DINj[i]) position of the matrix:

{1,0,0,0,0,0,0,0}
{0,1,0,0,0,0,0,0}
{0,0,1,1,1,0,0,0}
{0,0,1,1,0,0,0,0}
{0,0,1,0,1,0,0,0}
{0,0,0,0,0,1,1,1}
{0,0,0,0,0,1,1,0}
{0,0,0,0,0,1,0,1} d) APPX[i]=/APPXj[i]APPY[i]=/APPYj[i]

The result of the comparison is Cij=0.

The overall result of the comparisons is:

$$Sdj = \sum_{i=1}^{27} Cij$$

Once Sfj, Smj and Sdj have been evaluated, they can be inserted to calculate Sj. Then, the overall score Sj assigned to the comparison with the j-th character in the reference database is evaluated for each of the Ncar reference characters. The identifier of the reference character with the minimum score is assigned to the unknown input symbol.

The role played by the dimensional parameters X and Y is important for the recognition of characters with the same shape and different size. For example, the following pairs of ambiguous characters are considered:

| | | |
|---|---|---|
| 1) | ' | / |
| 2) | C | c |
| 3) | l | e |
| 4) | M | m |
| 5) | N | n |
| 6) | O | o |
| 7) | U | u |
| 8) | V | v |
| 9) | X | x |
| 10) | Z | z |

If the unknown input character is assigned by the recognizer to one of the above pairs, a feed-back process is performed in order to accurately identify the ambiguous character. The weight of the Wx and Wy factors is increased, then recognition is re-run restricting the reference character set to the symbols which belong to the considered pair. This makes it possible to distinguish ambiguous character from each other, without assigning a too large weight to the size terms in the main recognition flow.

The role played by the weighting factors Wf, Wm and Wd as well as by the stroke and size weights Ws, Wx and Wy is very important. In fact, the larger Wf and Wm are, the more important is the weight of the optical information in the recognition process. Another important parameter is the stroke weight Sw: the larger it is, the larger is the influence of the stroke number. Therefore, depending on the application, it is possible to weight the relative importance of the optical and dynamic part of the algorithm by trimming these factors. For example, if the recognition algorithm is used for recognition of Japanese character, which are generally written with the same stroke sequence, the dynamic contribution becomes very important and the Wf and Wm parameters should be smaller than those used for Roman characters. Likewise, Ws and Wd should be larger and the size weights Wx and Wy should not be used. For some applications this weighting factors can be trimmed by the user. Simulation results show that for Roman characters best values for weighting factors are Wf=4, Wm=1, Wd=5, Ws=72, Wx=8 and Wy=10. When the feed-back routine is applied in order to recognize ambiguous characters, Wx is set to 10 and Wy is set to 50. For Japanese characters best values are: Wf4, Wm=1, Wd=8, Ws=100, while Wx=Wy=0. For geometrical symbol and drawing recognition, the recognition algorithm must be purely optical. This means that Wd, Ws, Wy and Wy should be set to zero.

If a badly written symbol is unintentionally inserted into the database, it can degrade the system knowledge and negatively influence the system recognition performance. To overcome this problem, every time a given character in the database causes a misrecognition and a new example is introduced in the reference set, the 'bad symbol' is marked. After a given number of markings NM (typically 3), the character is classified as misleading and it is automatically deleted from the database. The NM value is stored in the 84-th byte of the character code.

We claim:

1. A method for recognizing a script written character comprising the steps of entering the character using character entering means;

digitizing the character;

storing the digitized character;

extracting topological features and vector features of said character;

extracting microfeatures of the character;

determining dimension of the character;

comparing the topological and vector features, microfeatures and dimensions of the character with a set of reference features equivalent thereto and stored in a memory, each of the set corresponding to a specific character; and performing a logic process to determine which of the set of reference features most closely corresponds to the topological features, the vector features, the microfeatures and the dimensions of the digitized character, thereby recognizing the script written character.

2. The method of claim 1, wherein extracting features comprises weighting the features of one of the topology, the vector, the microfeature and the dimensions more than the others in a predetermined manner in dependance on the nature of the character.

3. The method of claim 3, wherein the microfeature code is given by:

$$Smj = \left\{ \sum_{k=1}^{5} \sum_{i=1}^{15} M[Rik][Rjik] \right\} / \max(P, Pj)$$

where

Rik (k=1, ... 5, i=1 ... 15) is the microfeature code of the input character,

Rjik (k=1, ... 5, i=1 ... 15) is the microfeature code of the j-th reference character, P is the number of non-zero Rik elements, Pj is the number of non-zero Rjik elements, and M is the following matrix:
{0,0,0,0,0,0,0,0}
{0,3,0,2,1,2,0,1}
{0,0,3,2,1,0,2,1}
{0,2,2,3,0,1,1,2}
{0,1,1,0,3,2,2,0}
{0,2,0,1,2,3,1,1}
{0,0,2,1,2,1,3,1}
{0,1,1,2,0,1,1,3}.

4. The method of claim 1, wherein extracting microfeatures of the character comprising obtaining optical information relating to the nature of the character to produce of microfeature code.

5. The method of claim 1, wherein digitizing the character comprises constructing a matrix in ones and zeros and an array of points which are representative of the character.

6. The method of claim 5, further comprising scanning the matrix representing the character to determine a microfeature code when a black pixel is found in a row of the matrix memorizing the neighbouring pixels in the row below and assigning a code indicative of the neighbouring pixels.

7. The method of claim 6, wherein extracting a vector code comprises extracting a code indicative of the number of points of said character.

8. The method of claim 5, wherein extracting the vector code further comprises extracting a code which describes the position of each point of the array relative to the previous point.

9. The method of claim 1, wherein the step of determining dimensions of the character comprises determining X and Y dimensions of the character and determining a dynamic score and performing a weighting operation on each of the X and Y dimensions to enable differentiation of characters have similar shapes, but different dimensions.

10. The method of claim 1, wherein the entering step comprises inputting the character into a position on a frame and entering means assigning codes to the character dependant on its position in that frame.

11. The method of claim 1, wherein performing the logic process comprises evaluating a score Sj for each of the reference characters (Ncar) and identifying the reference character with the lowest score Sj as the character that was entered as the script written character, wherein Sj is given by:

$$Sj = Wf*Sfj - Wm*Smj - Wd*Sdj + Ws*|St-Stj| + Wx*|X-Xj| + Wy*|Y-Yj|$$

where:

Sfj is the feature extraction score
Smj is the microfeature detection score
Sdj is the dynamic score
Wf is a weighting factor for Sfj
Wm is a weighting factor for Smj
Wd is a weighting factor for Sdj
St is the stroke number of the input character
Stj is the stroke number of the j-th reference character
Ws is the stroke weighting factor
X is the width of the input character
Xj is the width of the j-th reference character
Wx is the width weighting factor
Y is the height of the input character
Yj is the height of the j-th reference character
Wy is a height weighting factor.

12. Apparatus for recognizing a script written character comprising:

character enter means for entering and receiving the character;

digitizing means for digitizing the character;

storage means for storing the digitized features;

feature extracting means for extracting topological features;

vector features microfeatures and dimension features representative of said character;

comparing means for comparing the extracted features of the character with a set of reference features stored in a memory, each of the set corresponding to a specific character; and logic means for identifying which of the set of reference features most closely corresponds to the features of the digitized character, thereby recognizing script written character.

13. Apparatus according to claim 12, further including weighting means associated with the feature extracting means capable of giving a different weighting factor to each of said features in a predetermined manner which is in dependance of the nature of the character.

14. Apparatus according to claim 13, wherein the vector features weighting factor is higher than the topological features weighting factor for Japanese script.

15. Apparatus according to claim 13, wherein the vector features weighting factor is lower than the topological features weighting factor for Roman script.

16. Apparatus according to claim 13, wherein the microfeatures and the dimension features are used to resolve the identity of characters which have similar characteristics.

17. Apparatus according to claim 12, wherein the feature extracting means comprise code generating means for generating a plurality of codes indicative of the features.

18. Apparatus according to claim 12, wherein the comparing means compares codes of the reference set and code for the input character.

19. Apparatus according to claim 12, wherein the logic means evaluated a score Sj for each reference character (Nd) and identifies the reference character with the lowest score as that corresponding to the script written characters, wherein Sj is given by:

$$Soj = SW*|S - Stj| + \sum_{i=1}^{99} |fi - fij| + IW* \sum_{i=1}^{32} |Ni - Nij|$$

where:

S=stroke number of the input character
Stj=stroke number of the j-th reference character
fi=response of the i-th feature to the input character
fij=response of the i-th feature to the j-th reference character
Ni=number of intersections of the i-th line with the input character
Nij=number of intersections of the i-th line with the j-th reference character
SW=stroke weight
IW=intersection weight.

20. Apparatus according to claim 12, wherein an interface is provided between the apparatus and a computer such that the interface passes the identified character to the computer thereby forming part of the instructions for the computer.

21. A computer based product including apparatus according to claim 12, and an interface between the apparatus and a computer for passing instruction to the computer from the apparatus.

* * * * *